(12) United States Patent
Tanaka et al.

(10) Patent No.: US 6,661,649 B2
(45) Date of Patent: Dec. 9, 2003

(54) INFORMATION-PROCESSING DEVICE AND REMOVABLE UNIT

(75) Inventors: Kaigo Tanaka, Kawasaki (JP); Sonomasa Kobayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/077,858

(22) Filed: Feb. 20, 2002

(65) Prior Publication Data

US 2003/0053289 A1 Mar. 20, 2003

(30) Foreign Application Priority Data

Sep. 18, 2001 (JP) .................................. 2001-283802

(51) Int. Cl.$^7$ .................................................. H05K 5/00
(52) U.S. Cl. ..................... 361/683; 361/801; 349/905; 312/223.3; 248/917
(58) Field of Search ................... 361/683, 740, 361/759, 801, 802, 724–726; 345/169, 905; 312/223.1–223.6; 248/917–919

(56) References Cited

U.S. PATENT DOCUMENTS 6,191,941 B1 * 2/2001 Ito et al. ....................... 361/683
6,233,141 B1 * 5/2001 Lee et al. ..................... 361/683

FOREIGN PATENT DOCUMENTS

GB 2194213 * 3/1988
JP 2000-51517 2/2000

* cited by examiner

Primary Examiner—Darren Schuberg
Assistant Examiner—Hung Van Duong
(74) Attorney, Agent, or Firm—Armstrong, Kratz, Quintos, Hanson & Brooks, LLP

(57) ABSTRACT

An information-processing device includes a main body part having an accommodating part, a display part and a removable unit that is detachably attached to the accommodating part. The removable unit has latch detents receivable in latch receiving parts provided on the accommodating part. The information-processing device further includes guide grooves provided on one of the accommodating part and the removable unit and guide rails provided on the other one of the accommodating part and the removable unit. The latch receiving parts are formed on one of the guide grooves and the guide rails and have a height that is substantially equal to a height of the guide rails or a depth of the guide grooves.

14 Claims, 10 Drawing Sheets

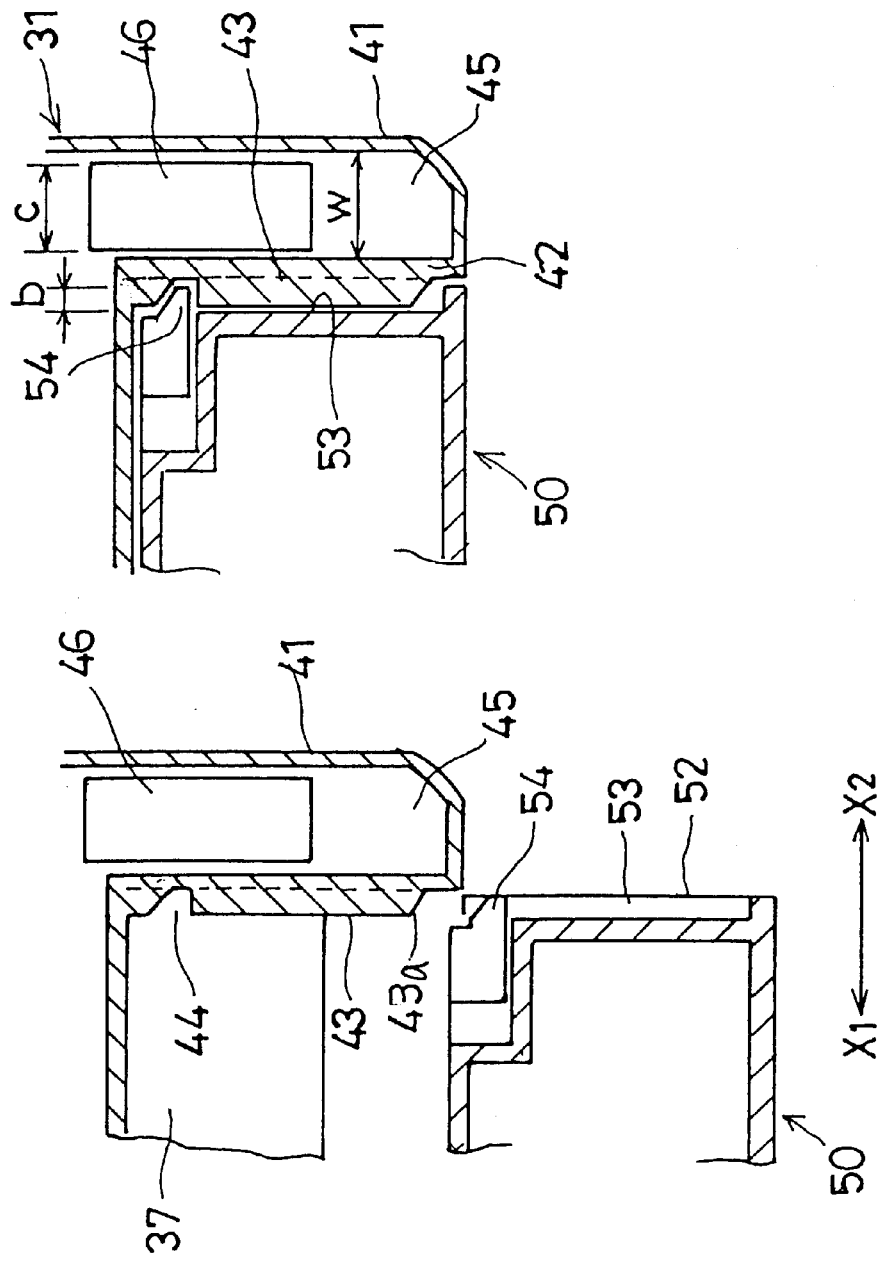

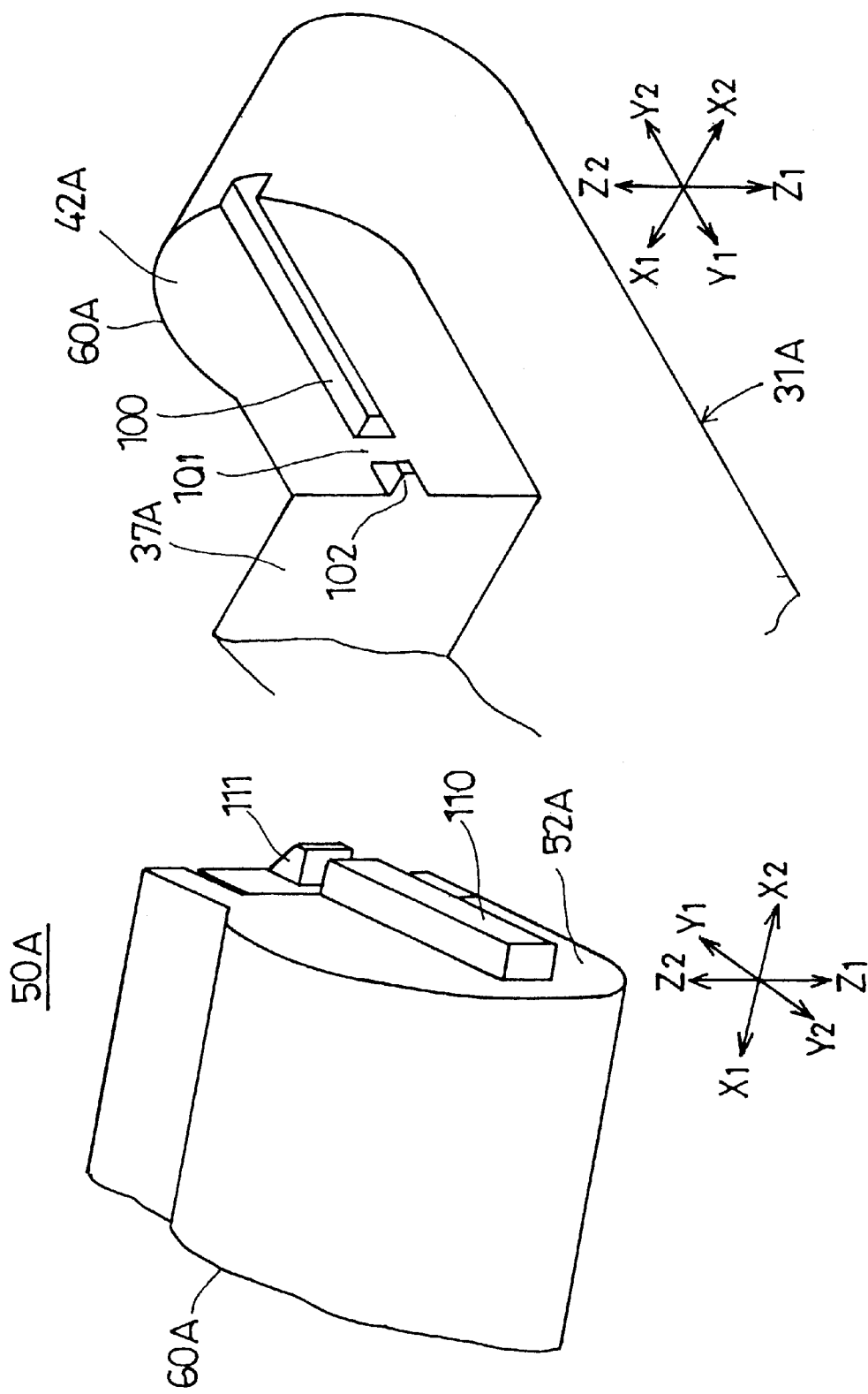

INFORMATION-PROCESSING DEVICE AND REMOVABLE UNIT

BACKGROUND OF THE INVENTION

1. Field of the Invention

The present invention relates to an information-processing device and a removable unit and particularly relates to a battery-operated portable personal computer (PC) and a battery pack to be attached to a portable PC.

The portable PCs are equipped with various electronic components provided inside the main body parts. In order to improve functionality of the portable PCs under constraints of their external sizes, more electronic components should be assembled within a limited space inside the main body part. Accordingly, it is preferable that a structure for attaching a battery pack does not have any protruded parts extending into the space inside the main body part.

2. Description of the Related Art

FIGS. 1A, 1B and 1C are diagrams showing a battery pack attaching structure of the related art. FIG. 1A is a perspective view of a portable personal computer (PC) 10. Double-headed arrows Y1–Y2, X1–X2 and Z1–Z2 indicate depth-wise, width-wise and height-wise directions, respectively. The portable PC 10 includes a main body part 11 and a foldable liquid display part 12. A battery pack 20 is attached to the portable PC 10 by being accommodated in a battery-pack accommodating-part 13, which is a recessed part provided in the main body part 11. When the battery pack 20 is in its accommodated state, a connector 21 provided on the battery pack 20 is connected to a connector 18 provided on the main body part 11.

The battery-pack accommodating-part 13 has end walls 14 at the X1- and X2-ends thereof. As shown in FIGS. 1B and 2A, the end wall 14 is provided with a guide rail 15 and a latch hole 16.

The battery-pack 20 has end walls 22. As shown in FIGS. 1C and 2B, the end walls 22 are provided with a guide groove 23 and a latch detent 24.

The battery pack 20 is inserted into the battery-pack accommodating-part 13 in the Y1-direction with the guide grooves 23 being guided by the guide rails 15 of the battery-pack accommodating-part 13. The latch detents 24 are pressed in while guided along the guide rails 15. Thus, the battery pack 20 is accommodated in the battery-pack accommodating-part 14 and is attached to the main body part 11 with the protruded latch detents 24 being latched to the latch holes 16.

In order to prevent intrusion of any dust, box-shaped walls 17 are provided at the latch holes 16. The box-shaped walls 17 protrude inwardly toward the main body part 11.

Regarding the battery pack 20, the latch detents 24 are located at positions towards the Y1-direction from the Y1-ends of the guide grooves 23. The latch detents 24 protrude from the end walls 22 of the battery pack 20.

Since the box-shaped wall 17 protrudes inwardly toward the main body part 11, an internal space 18 in the main body part 11 is reduced by a dimension "a". This may give rise to a difficulty for some electronic components to be built inside the space 18.

Also, since the latch detents 24 are located at positions towards the Y1-direction from the Y1-ends of the guide grooves 23, when inserting the battery pack 20 into the battery-pack accommodating-part 13, the latch detents 24 touch the walls 14 before the guide grooves 23 accept the guide rails 15. With such a structure, the battery pack 20 is subjected to a resistance force while its position is unstable. Therefore, the position of the battery pack 20 may be displaced vertically and it becomes difficult to allow the guide rails 15 to accept the guide grooves 23. This prevents a smooth operation when starting to insert the battery pack 20 into the battery-pack accommodating-part 13.

Further, a flat bottom surface 25 of the battery pack 20 may give rise to a problem in that the fingers may slip and not be able to grip the battery pack 20 securely. Accordingly, such a flat bottom surface 25 gives rise to a difficulty in removing the battery pack 20 from the battery-pack accommodating-part 13.

SUMMARY OF THE INVENTION

Accordingly, it is a general object of the present invention to provide an information-processing device and a removable unit which can solve the problems above.

It is another and more specific object of the present invention to provide an information-processing device and a removable unit in which space required for latching mechanisms is reduced.

In order to achieve the above objects, an information-processing device includes:

a main body part having an accommodating part;

a foldable display part;

a removable unit that can be accommodated in the accommodating part, the removable unit having latch detents receivable in latch receiving parts provided on the accommodating part; and guide grooves provided on one of the accommodating part and the removable unit and guide rails provided on the other one of the accommodating part and the removable unit. The latch receiving parts are formed on one of the guide grooves and the guide rails and have a height that is substantially equal to a height of the guide rails or a depth of the guide grooves.

With the information-processing device described above, the space required for the latching mechanism is limited to the height of the guide rail. Therefore, there is no protrusion towards the space inside the information-processing device. Therefore, an electronic component having a greater size can be incorporated in the space inside the information-processing device of the present invention as compared to the information-processing device of the related art.

It is still another object of the present invention to provide an information-processing device in which the removable unit can be removed easily.

In order to achieve the above object, the removable unit has a bulging part provided near knobs for unlatching the latch detents from the latch receiving parts.

With the information-processing device described above, when attempting to remove the removable unit from the information-processing device, it becomes easier for the user to grab the removable unit using the fingers. In other words, the force exerted by the fingers can be effectively applied to the removable unit.

It is yet another object of the present invention to provide an information-processing device in which the removable unit can be attached easily.

In order to achieve the above object, the latch receiving part is provided at a position along the guide rail but not at the end of the guide rail, or the latch receiving part is provided inside the guide groove.

With the information-processing device described above, when inserting the removable unit into the information-processing device, the latch detents touch the guide rails only after the guide grooves have fitted with the guide rails. Therefore, at an instant the user feels the load produced by the latch detents contacting the guide rails while inserting the removable unit into the accommodating part of the information-processing device, the guide grooves are already fitted with the guide rails and therefore the position of the removable unit is restricted. As a result, the removable unit can be smoothly accommodated in the accommodating part.

BRIEF DESCRIPTION OF THE DRAWINGS

FIGS. 7A and 7B are partial cross-sectional diagrams showing a state before and after attaching the battery pack, respectively, of an embodiment of the present invention.

FIGS. 9A and 9B are diagrams showing the battery pack attaching structure of another embodiment of the present invention.

DETAILED DESCRIPTION OF THE PREFERRED EMBODIMENTS

In the following, principles and embodiments of the present invention will be described with reference to the accompanying drawings.

Figures 1A, 1B, 1C:
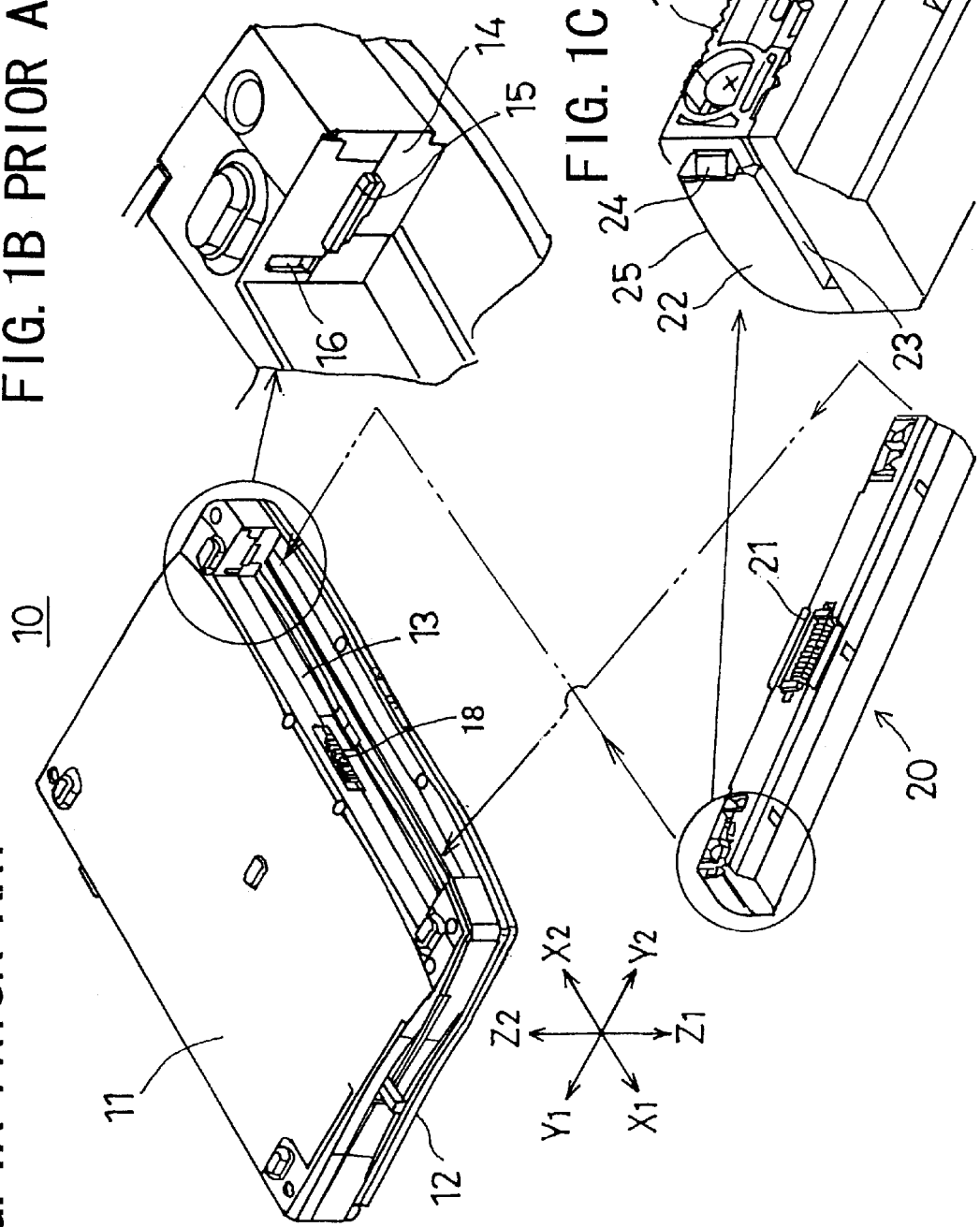
FIGS. 1A through 1C are diagram showing a battery pack attaching structure of the related art.
Figure 2A:
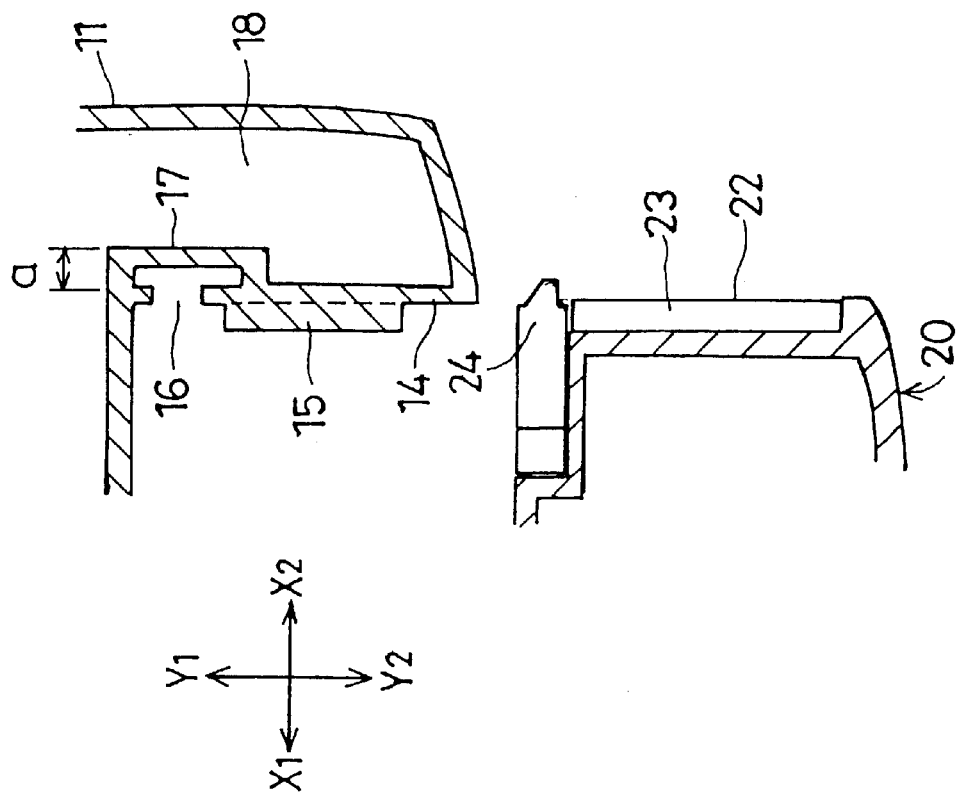
FIGS. 2A and 2B are partial cross-sectional diagrams showing a state before and after attaching the battery pack, respectively, of the related art.
Figure 2B:
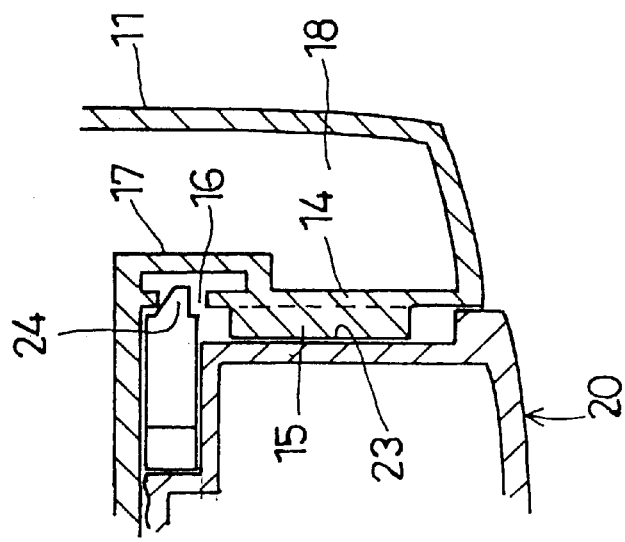
Figure 3:
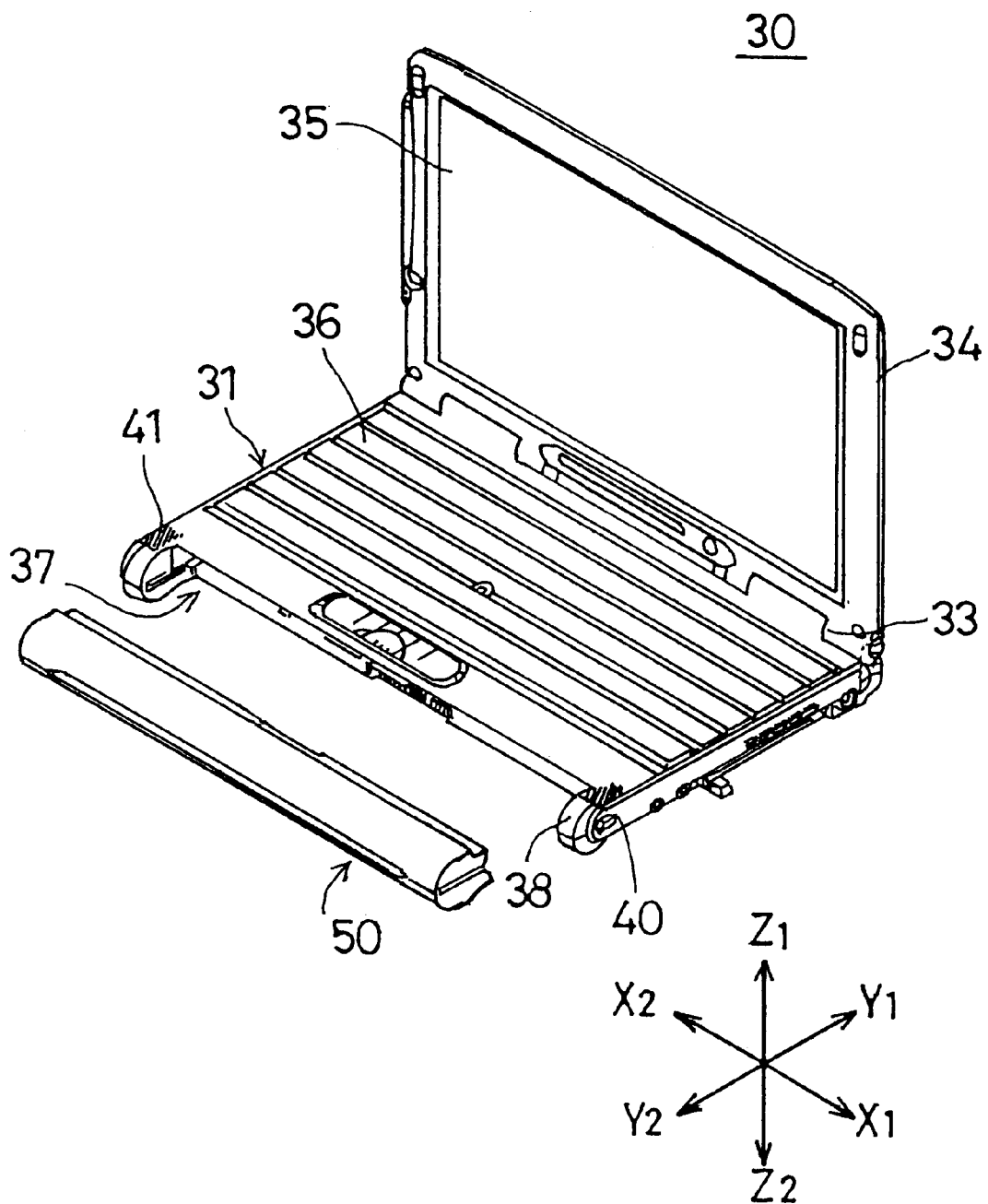
FIG. 3 is a perspective diagram showing a portable personal computer adopting a battery pack attaching structure of an embodiment of the present invention.
Figure 4A:
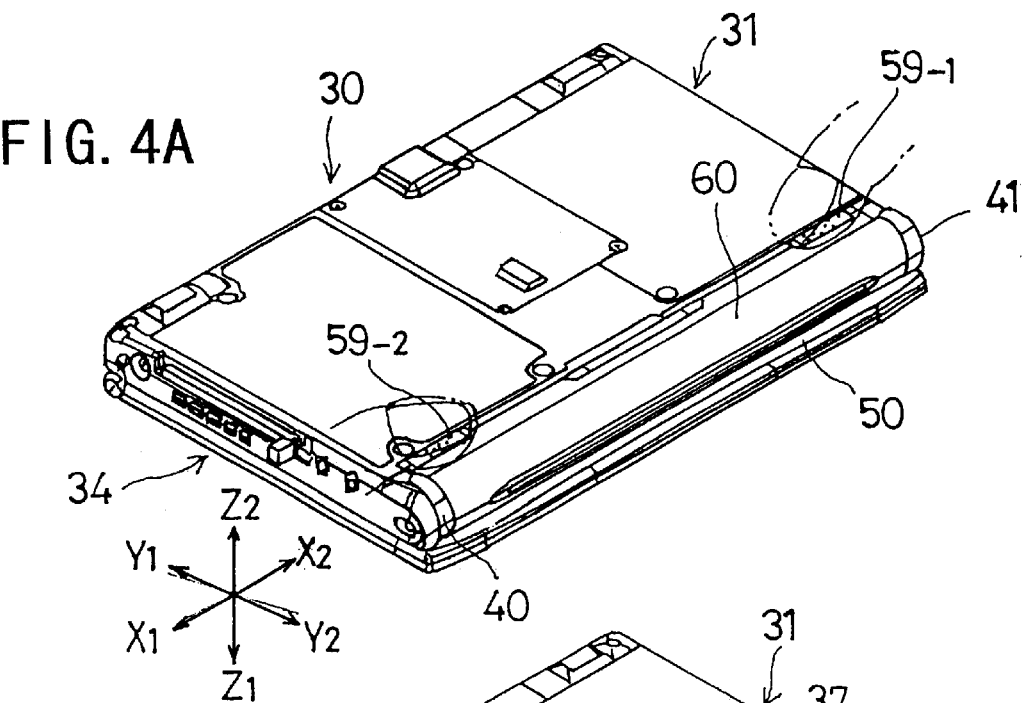
FIGS. 4A and 4B are diagrams showing the battery pack attaching structure of an embodiment of the present invention.
Figure 4B:
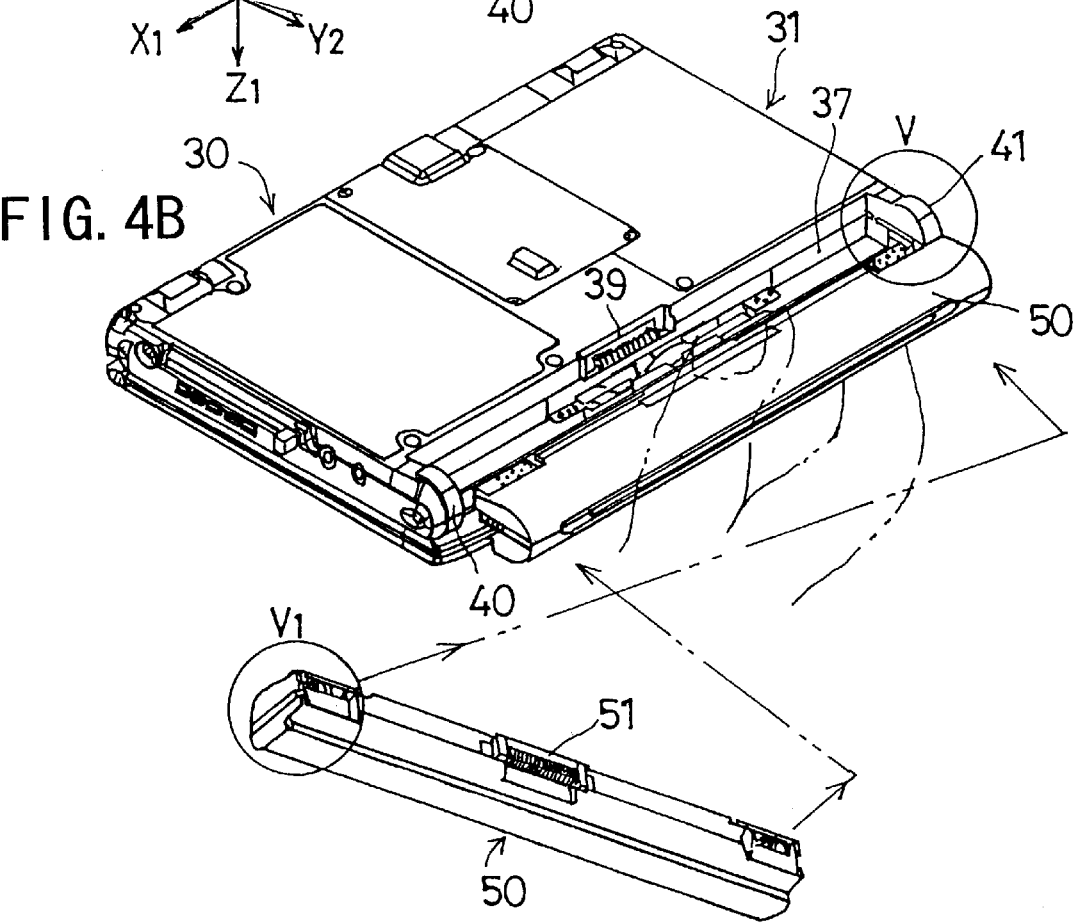

FIGS. 3, 4A and 4B are diagrams showing a battery pack attaching structure and a portable personal computer (PC) 30 adopting such a structure of an embodiment of the present invention. FIGS. 4A and 4B are perspective diagrams showing the portable PC 30. Double-headed arrows Y1–Y2, X1–X2 and Z1–Z2 indicate depth-wise, width-wise and height-wise directions, respectively. The portable PC 30 includes a main body part 31 and a liquid display part 34 which is foldable against the main body part 31 by a journal part 33 provided on a distal edge of the main body part 31. The distal edge is an edge opposite to an edge closer to the user. The liquid display part 34 may take a closed position where it leans on the main body part 31 and an open position where it is upright with respect to the main body part 31. The main body part 31 is provided with an information-processing part disposed therein, such as a CPU, and a keyboard part 36 disposed on an upper surface of the main body part 31. On a proximate edge of the main body part 31, a battery-pack accommodating-part 37 for accommodating a battery pack 50 is formed such that it is recessed with respect to a proximate surface 38 of the main body part 31. The proximate edge is an edge nearer to the user. The battery pack 50 accommodates a plurality of batteries. The battery pack 50 is snugly fitted to the battery-pack accommodating-part 37 and a connector of the battery pack 50 is connected to a connector 39 of the main body part 31.

The main body part 31 is provided with arm parts 40 and 41 provided on the X1- and X2-ends of the Y2-edge, respectively, and extending in the Y2-direction.

The battery pack attaching structure of the present invention will be described with reference to FIGS. 5A and 5B.

Figure 5A:
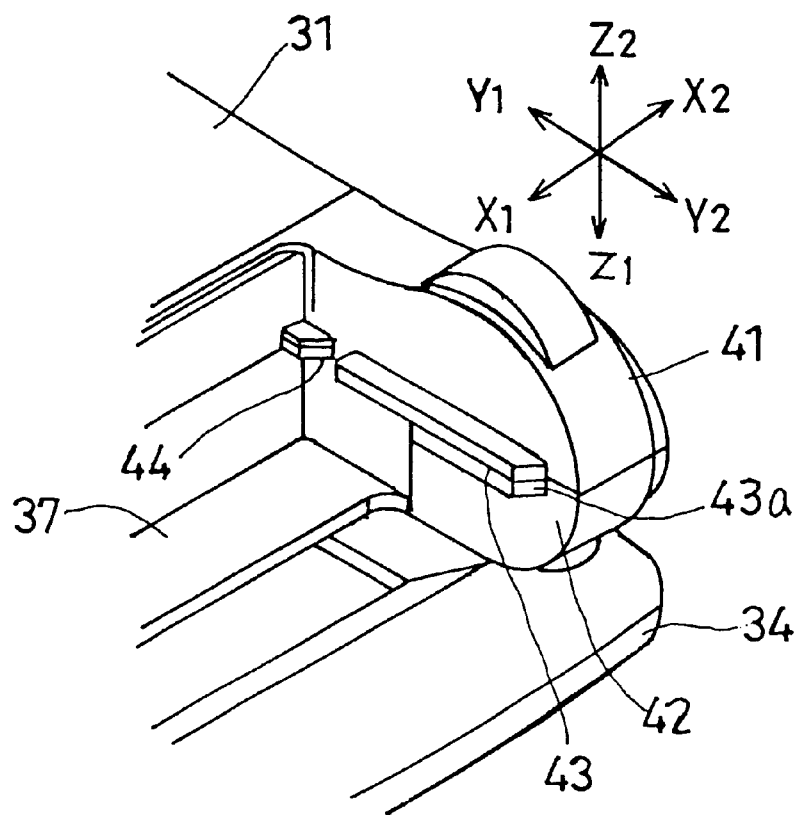
FIGS. 5A and 5B are enlarged diagrams of a circled region V shown in FIG. 4B.
Figure 5B:
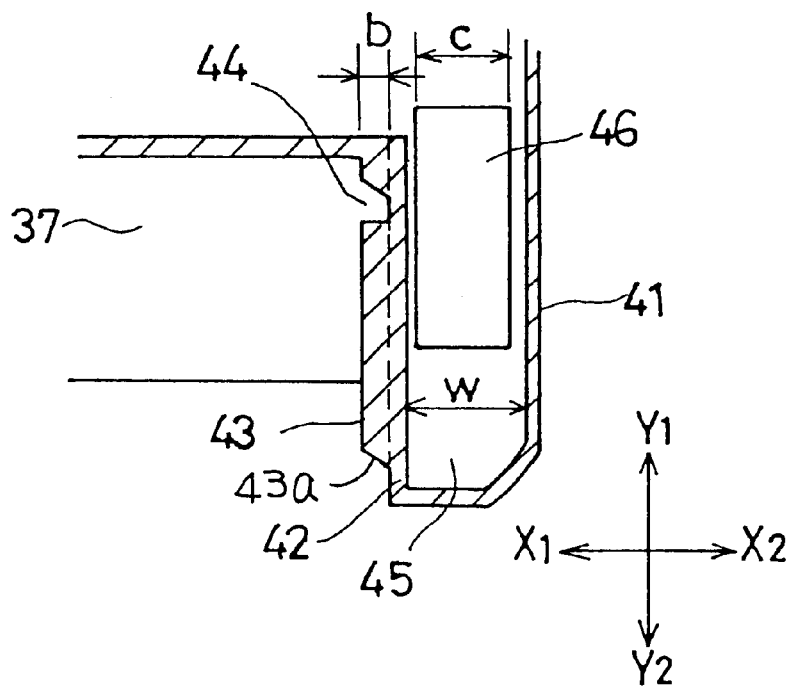

As shown in FIGS. 5A and 5B, the battery-pack accommodating-part 37 of the main body part 31 includes X1- and X2-end walls 42. Each of the walls 42 is provided with a guide rail 43 and a latch recess part 44. The guide rail 43 protrudes from the wall 42 inwardly toward the battery-pack accommodating-part 37 by a dimension "b" and extends along the Y1-, Y2-direction. The latch recess part 44 is formed as a cutaway part of the guide rail 43 and serves as a latch receiving part. The Y2-end of the guide rail 43 is an inclined surface 43a for allowing easy retraction of a latch detent 54 described below.

Figure 6A:
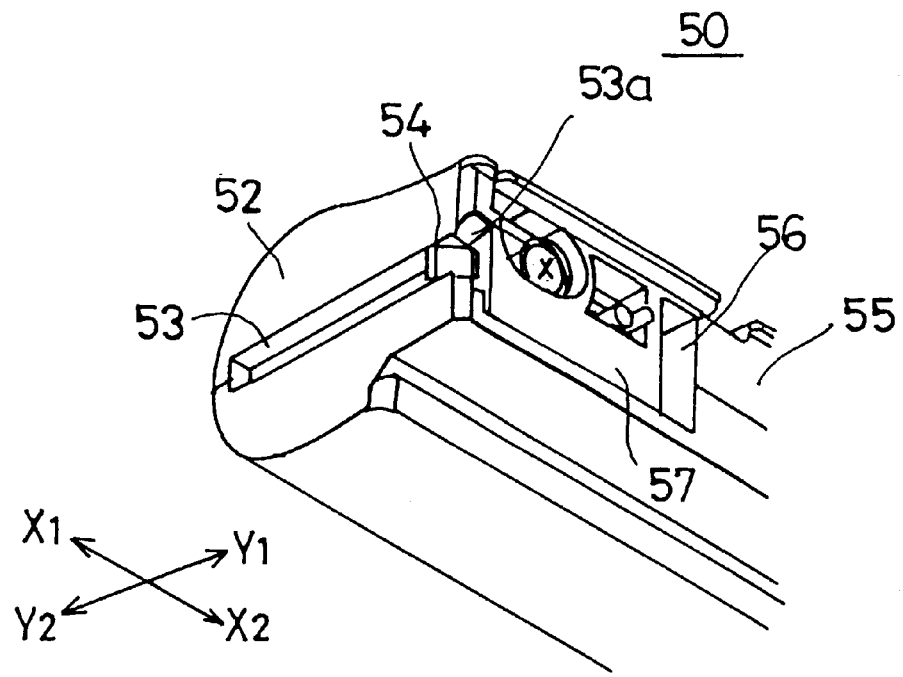
FIGS. 6A and 6B are enlarged diagrams of a circled region VI shown in FIG. 4B.
Figure 6B:
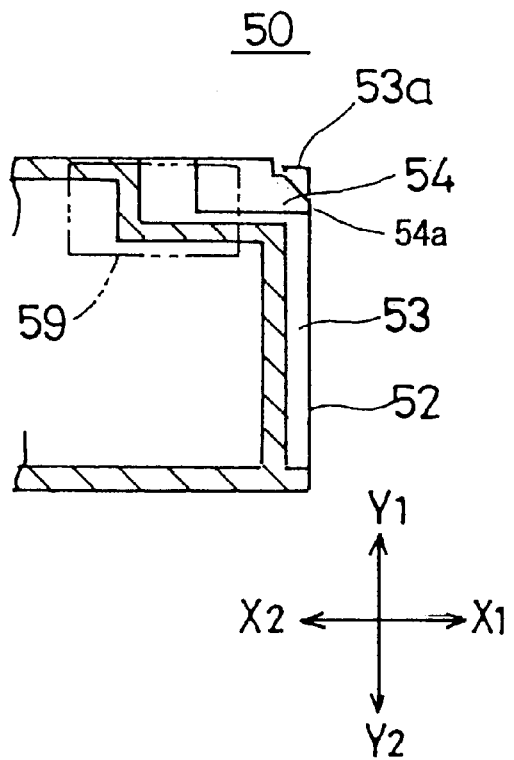

As shown in FIGS. 6A and 6B, a guide groove 53 and the latch detent 54 are formed on each of end surfaces 52 of the battery pack 50. The guide groove 53 extends along the Y1-, Y2-directions. The latch detent 54 is formed within the guide groove 53 at a position slightly towards the Y2-direction from the Y1-end of the guide groove 53 and a tip part 54a of the latch detent 54 does not protrude from the end surface 52 of the battery pack 50. The Y1-end 53a of the guide groove 53 is tapered to provided easy fitting with the guide rail 43.

It is to be noted that the latch detent 54 is provided in a recessed part 56 formed on a front surface 55 of the battery pack 50 in such a manner that it is movable along the X1-, X2-directions. The latch detent 54 is formed on a latch detent member 57 that is biased in the X1-direction by means of a spring (not shown).

FIGS. 4B and 7A show how the battery pack 50 is attached to the portable PC 30. As shown in the figures, the user grabs the battery pack 50 and places it at a position opposing the battery-pack accommodating-part 37. Then the battery pack 50 is pressed towards the Y1-direction until it reaches a position shown in FIG. 7B.

In other words, the guide groove 53 is fitted with the guide rail 43 and inserted in the Y1-direction and the latch detent 54 is latched by the latch recess part 44.

As can be seen from FIGS. 7A and 7B, a space occupied by the latching mechanism is within a region defined by the protruding dimension "b" of the guide rail 43. There is no protrusion from the wall 42 to the space 45. Accordingly, the extension part 41 (40) is configured such that the space 45 provided between the wall 42 and the sidewall of the main body part 31 and having a dimension "w" can be used to its maximum extent. A loud speaker 46 having a width "c" that is approximately equal to the width "w" is provided inside the extension part 41 (40).

While inserting the battery pack 50, the latch detent 54 is restrained by the guide rail 43 and retracted in the X1-direction. Thereafter, the latch detent 54 protrudes and fits in the latch recess part 44.

Also, since the latch detent 54 is provided in the guide groove 53 at a position slightly towards the Y2-direction from the Y1-end, the Y1-end of the guide rail 43 can be smoothly fitted to the Y2-end of the guide groove 53 without interference of the latch detent 54. A load is applied when the latch detent 54 abuts the guide rail 43 and it is likely that the position of the battery pack 50 becomes unstable. However, it is only when guide groove 53 is fitted with the guide rail 43 and the position of the battery pack 50 is confined in the Z1–Z2 direction that the latch detent 54 abuts the Y2-direction end of the guide rail 43. Therefore, even if a load is applied when the latch detent 54 abuts the guide rail 43, the position of the battery pack 50 does not become unstable and the battery pack 50 can be attached in a smooth manner.

In order to remove the battery pack 50 from the main body part 31 of the portable PC 30, the portable PC is positioned as shown in FIG. 4A. Then, user moves right and left knobs 59-1 and 59-2 towards the center using his fingers. Then, the user moves his fingers in the Y2-direction. In the present invention, the lower surface of the battery pack 50 is provided with a bulging part 60 having a concaved shape along the contour of the battery accommodated therein. Such a shape facilitates gripping of the battery pack 50. Accordingly, the battery pack 50 can be removed from the portable PC 30 in a smooth manner.

It is to be noted that when the user grips the right and left sides of the main body part 31 with his right and left hands and lifts the portable PC 30 in a state shown in FIG. 3, his thumbs touching the upper surface of the battery pack 50 will press the battery pack 50 in the Z2-direction. Therefore, the battery pack 50 will deform such that it is concave in the Z2-direction. In some cases, connections between the connector 51 and the connector 39 may become unstable.

Figure 8A:
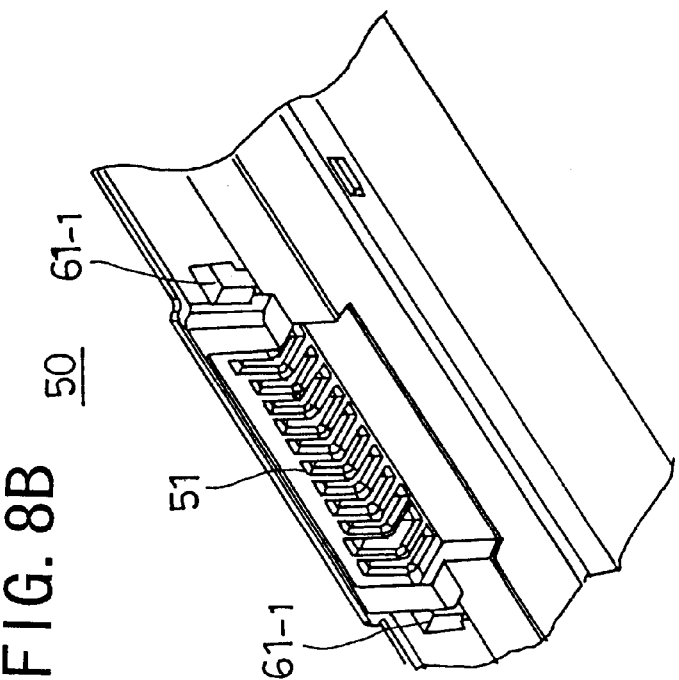
FIGS. 8A and 8B are diagram showing connectors of the accommodating part and the battery pack, respectively.
Figure 8B:
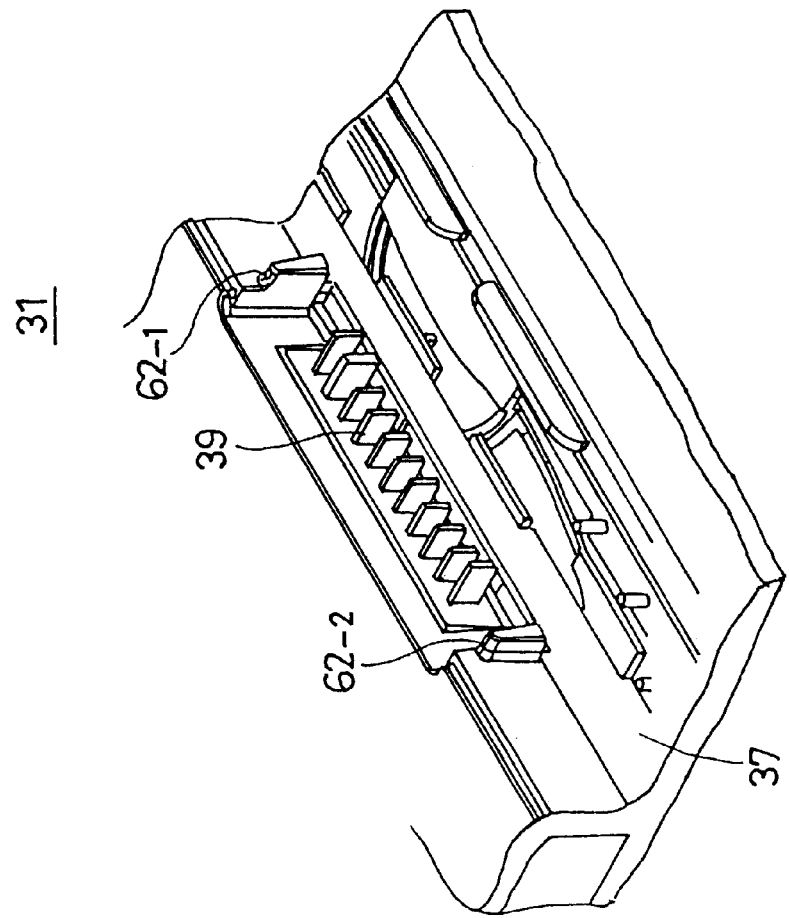

Such a problem may be obviated with the structure described below. As shown in FIG. 8B, recessed parts 61-1 and 61-2 are formed on either sides of the connector 51 of the battery pack 50. These recessed parts 61-1 and 61-2 are provided for receiving detent parts (not shown) of a connector (not shown) of a battery charger (not shown) while recharging the battery by means of the battery charger. As shown in FIG. 8A, the battery-pack accommodating-part 37 of the main body part 31 is provided with protruded parts 62-1 and 62-2 on either side of the connector 39. When the battery pack 50 is in its accommodated state, the protruded parts 62-1 and 62-2 are received in the recessed parts 61-1 and 61-2, respectively. Accordingly, in a state shown in FIG. 3, even if the user grips the right and left sides of the main body part 31 with his right and left hands and lifts the portable PC 30 and the thumbs touching the upper surface of the battery pack 50 press the battery pack 50 in the Z2-direction, deformation of the battery pack 50 will be restricted. Therefore, connections between the connector 51 and the connector 39 will not become unstable and will maintain a stable state.

In the present invention, the main body part 31 is provided with protruded parts 62-1 and 62-2 and there are no recessed parts. Accordingly, the space inside the main body part 31 will not be narrowed.

A battery pack attaching structure of another embodiment of the present invention will be described below.

The battery pack attaching structure of the present embodiment differs from the battery pack attaching structure of the above-described embodiment in that the guide rails and the guide grooves are in the reversed relationship. In other words, the guide rails are provided on the battery pack and the guide grooves are provided on the battery-pack accommodating-part. In FIGS. 9 and 10, elements corresponding to the elements shown in FIGS. 5, 6 and 7 are labeled with the same reference numerals accompanied by a subscript "A".

Figure 10A:
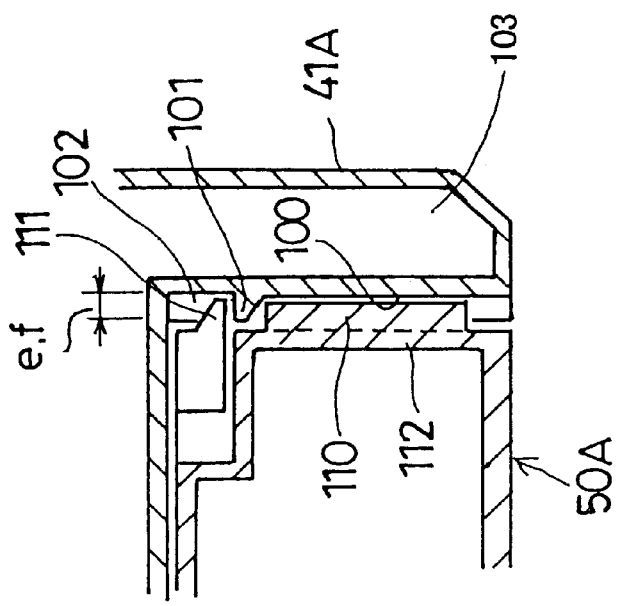
FIGS. 10A and 10B are partial cross-sectional diagrams showing a state before and after attaching the battery pack, respectively, of another embodiment of the present invention.

As shown in FIGS. 9B and 10A, a guide groove 100 extends along the Y1-, Y2-directions on the end wall 42 of the battery-pack accommodating-part 37A of the main body part 31A. A protruded part 101, which fills a part of the guide groove 100, is provided near the Y1-end of the guide groove 100. Reference numeral 102 shows a groove part that is positioned on the Y1-side of the protruded part 101. The protruded part 101 and the groove part 102 constitute a latching mechanism.

As shown in FIGS. 9A and 10A, a guide rail 110 is provided along the Y1-, Y2-directions on an end-surface 52A of a battery pack 50A. A latch detent 111 is also provided on the end-surface 52A of the battery pack 50A. The latch detent 111 is provided on the Y1 side of the guide rail 110 in a position aligned with the guide rail 110.

The battery pack 50A is accommodated in a manner similar to the battery pack 50 described above. As shown in FIG. 10A, the user grabs the battery pack 50A and places it at a position opposing the battery-pack accommodating-part 37A. Then the battery pack 50A is pressed towards the Y1-direction until it reaches a position shown in FIG. 10B.

Figure 10B:
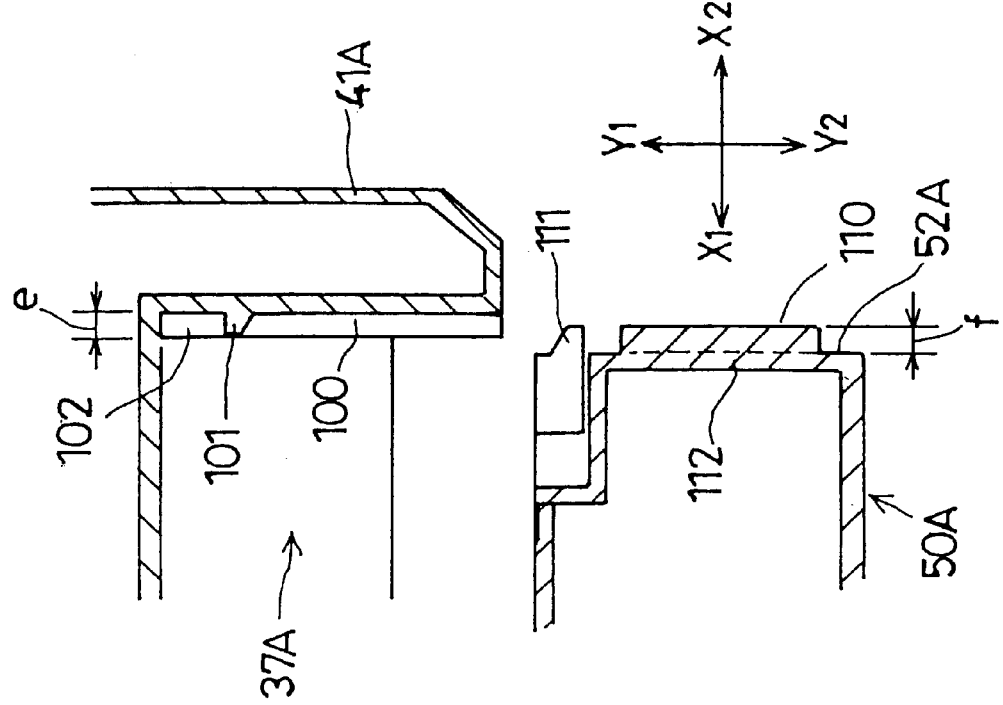

In other words, the latch detent 111 and the guide rail 110 are fitted in the guide groove 100 and then guided and inserted in the Y1-direction. As shown in FIG. 10B, the latch detent 111 passes over the protruded part 101 and is received in the groove part 102. Accordingly, the latch detent 111 is latched in the groove part 102 and the attaching process is completed.

It is to be noted that the latch detent 111 passes over the protruded part 101 when the battery pack 50A is inserted in the battery-pack accommodating-part 37A to a considerable extent. In this state, the guide rail 110 is sufficiently inserted in the guide groove 100. Therefore, even if a load is applied when the latch detent 111 touches the protruded part 101, the position of the battery pack 50A will not become unstable. It is only when the battery pack 50A is sufficiently inserted into the battery-pack accommodating-part 37A that a load is applied to the user's hand. Until then, the user does not feel the load on his hand. Therefore, the battery pack 50A can be accommodated in the battery-pack accommodating-part 37A in a smooth manner.

As can be seen from FIGS. 10A and 10B, regarding the main body part 31A, the space required for the latching mechanism is within a range defined by the depth dimension "e" of the guide groove 100. Therefore, inside an arm part 41A, there is no protrusion other than the guide groove 100. Accordingly, a larger space 103 is formed inside the arm part 41A.

Regarding the battery pack 50A, the space required for the latching mechanism is within a range defined by a protrusion dimension "f" of the guide rail 110. There is no protrusion from the wall 112 forming the end-surface 52A to the internal space of the battery pack 50A. Accordingly, when the size of batteries accommodated in the battery pack 50A are the same, the dimension of the battery pack 50A in the X1–X2 direction will become smaller than the battery pack 50 described above.

It is to be noted that the attaching structure of the present invention can be applied not only to battery packs but also to any extension unit that can be attached to a portable personal computer by inserting it in a bay provided in the portable personal computer.

Further, the present invention is not limited to these embodiments, and variations and modifications may be made without departing from the scope of the present invention.

The present application is based on Japanese priority application No. 2001-283802 filed on Sep. 18, 2001, the entire contents of which are hereby incorporated by reference.

What is claimed is:

1. An information-processing device comprising:

a main body part having an accommodating part;

a display part;

a removable unit that can be accommodated in said accommodating part, said removable unit having latch detents receivable in latch receiving parts provided on said accommodating part; and guide grooves provided on one of said accommodating part and said removable unit and guide rails provided on the other one of said accommodating part and said removable unit, wherein said latch receiving parts are formed on one of said guide grooves and said guide rails and have a height that is substantially equal to a height of the guide rails or a depth of the guide grooves.

2. The information-processing device as claimed in claim 1, wherein said latch receiving part is provided at a position along the guide rail but not at the end of said guide rail.

3. The information-processing device as claimed in claim 1, wherein said latch receiving part is provided inside the guide groove.

4. The information-processing device as claimed in claim 1, wherein said accommodating part is provided with a connector that can be connected to a connector provided on said removable unit, said accommodating part being provided with protruded parts on both sides of the connector that mate with recessed parts provided on both sides of the connector of said removable unit.

5. The information-processing device as claimed in claim 1, wherein said removable unit has a bulging part provided near knobs for unlatching the latch detents from the latch receiving parts.

6. An information-processing device having a main body part provided with an accommodating part for accommodating a removable unit having latch detents, said accommodating part having latch receiving parts for receiving the latch detents, wherein one of guide grooves and guide rails are provided in said accommodating part so as to mate with the other one of said guide grooves and guide rails, said latch receiving parts being formed on said one of said guide grooves and guide rails and having a height that is substantially equal to a height of the guide rails or a depth of the guide grooves.

7. The information-processing device as claimed in claim 6, wherein said latch receiving part is provided at a position along the guide rail but not at the end of said guide rail.

8. The information-processing device as claimed in claim 6, wherein said latch receiving part is provided inside the guide groove.

9. The information-processing device as claimed in claim 6, wherein said accommodating part is provided with a connector that can be connected to a connector provided on said removable unit, said accommodating part being provided with protruded parts on both sides of the connector that mate with recessed parts provided on both sides of the connector of said removable unit.

10. A removable unit that can be accommodated in an accommodating part of an information-processing device having latch-receiving parts in said accommodating part, and removable unit comprising:

latch detents configured to be received in said latch-receiving parts; and a bulging part provided near knobs for unlatching the latch detents from the latch receiving parts of the information processing device.

11. The removable unit as claimed in claim 10, wherein said detents are provided on guide rails that mate with guide grooves of the information-processing device, said detents being provided at a position near a leading edge of the removable unit when the removable unit is being inserted into said accommodating part.

12. A mechanism for detachably attaching a removable unit in an accommodating part of an information processing device, said mechanism comprising:

guide grooves and latch detents provided on said removable unit; and guide rails and latch receiving parts provided in said accommodating part of said information processing device, wherein said latch receiving parts have a height that is substantially equal to a height of the guide rails.

13. A mechanism for detachably attaching a removable unit in an accommodating part of an information processing device, said mechanism comprising:

guide rails and latch receiving parts provided on said removable unit; and guide grooves and latch detents provided in said accommodating part of said information processing device, wherein said latch receiving parts have a height that is substantially equal to a depth of the guide grooves.

14. A mechanism for detachably attaching a removable unit in an accommodating part of an information processing device, wherein a connector of said removable unit is connected to a connector provided in said accommodating part when said removable unit is attached to said accommodating part, and said information processing device is provided with protruded parts formed on either sides of and adjacent to said connector provided in said accommodating part, said protruded parts being configured to mate with recessed parts formed on either sides of and adjacent to said connector of the removable unit.

* * * * *